United States Patent
Richter et al.

(10) Patent No.: US 6,951,094 B2
(45) Date of Patent: Oct. 4, 2005

(54) MOWER WITH MULCHING FUNCTION

(76) Inventors: Harald Richter, Vojens Ring 5, 24629 Kisdorf (DE); Lutz Richter, Holsteinischer Kamp 72, 22081 Hamburg (DE)

( * ) Notice: Subject to any disclaimer, the term of this patent is extended or adjusted under 35 U.S.C. 154(b) by 0 days.

(21) Appl. No.: 10/692,084

(22) Filed: Oct. 23, 2003

(65) Prior Publication Data
US 2004/0123578 A1 Jul. 1, 2004

(30) Foreign Application Priority Data
Oct. 26, 2002 (DE) .......................................... 102 49 971

(51) Int. Cl.⁷ .......................... A01D 34/52; A01D 34/73
(52) U.S. Cl. ...................................... 56/255; 56/320.2
(58) Field of Search ............................... 56/255, 320.2, 56/295, 17.5, DIG. 20, DIG. 17

(56) References Cited

U.S. PATENT DOCUMENTS

| | | | |
|---|---|---|---|
| 3,057,140 A | 10/1962 | Ridenour et al. | 56/25.4 |
| 3,706,189 A | 12/1972 | Rutherford | 56/13.4 |
| 4,245,455 A * | 1/1981 | Martin | 56/12.8 |
| 5,094,065 A * | 3/1992 | Azbell | 56/255 |
| 5,142,851 A * | 9/1992 | Lydy et al. | 56/13.4 |
| 5,205,113 A | 4/1993 | Fassauer | 56/12.8 |
| 5,284,006 A * | 2/1994 | Sheldon | 56/255 |
| 5,363,636 A | 11/1994 | Lamoureux | 56/255 |
| 5,442,902 A * | 8/1995 | Mosley et al. | 56/17.5 |
| 6,062,013 A * | 5/2000 | Wolske | 56/295 |

FOREIGN PATENT DOCUMENTS

| | | |
|---|---|---|
| DE | 196 12 997 A1 | 9/1997 |
| DE | 199 47 934 A1 | 4/2001 |
| DE | 100 39 834 C2 | 3/2002 |
| FR | 2 835 393 A1 | 8/2003 |
| GB | 637832 | 5/1950 |
| WO | WO 99/65289 | 12/1999 |

OTHER PUBLICATIONS

One page English Abstract from esp@cenet for FR 2 835 393 A1, Aug. 2003.
One page English Abstract from esp@cenet for DE 196 12 997 A1, Sep. 1997.
One page English Abstract from esp@cenet for DE 19947934 A1, Apr. 2001.
One page English Abstract from esp@cenet for DE 10039834 C2, Mar. 2002.

* cited by examiner

Primary Examiner—Árpád Fábián Kovács
(74) Attorney, Agent, or Firm—Howson and Howson

(57) ABSTRACT

A mower with a blade housing, in which a blade rotates about a vertical rotational axis in a rotational plane, so that for movement of the mower in the mowing direction, the cutting material is cut corresponding to the diameter of the blade. The front region of the blade housing in the mowing direction is partially covered by a base plate, which extends between the blade and the ground. The blade has at least two cutting edges or cutting edge regions with different cutting heights in the radial direction.

15 Claims, 3 Drawing Sheets

MOWER WITH MULCHING FUNCTION

FIELD OF THE INVENTION

The invention concerns a mower with a blade housing, in which a blade rotates about a vertical rotational axis in a rotational plane, so that the cutting material is cut corresponding to the diameter of the blade when the mower moves in the mowing direction.

BACKGROUND OF THE INVENTION

Mowers, more specifically lawnmowers, are known in different configurations. In particular, one can distinguish between hand- or motor-driven mowers and between reel and rotary mowers. The reel mower comprises a spindle with blades, which are wound in a spiral and which rotate about a horizontal axis, and a straight counter blade near the ground. A rotary mower has a propeller-like blade with cutting edges rotating about a vertical axis. Here, the blade works without a counter blade and the grass is cut only due to the high rotational speed of the cutting edges.

Such rotary mowers usually have a relatively flat blade housing, which is supported by free-running or driven wheels at the front and back. The motor, which drives the blade, is located on the blade housing. Frequently, rotary mowers are provided with collection devices for the cut material. The blade housing on one side and the rotating blade on the other side are formed aerodynamically so that the cut material is pulled upwards and guided through a discharge opening into a collection basket.

In principle, a collection device is desirable if the lawn is to be used as productive ground or as a playing surface. On the other hand and particularly for biological reasons, however, it is desirable if at least a portion of the cut material is left on the freshly cut lawn. This prevents the ground from drying out and from becoming depleted in minerals. Therefore, it is known to not collect the cut grass but instead to let it lie on the ground. However, this has the desired effect only if the cut material is distributed uniformly on the ground. In addition, the cutting material should not exceed a certain length so that it can arrive between the remaining blades standing on the ground and decompose there.

So-called mulching mowers are known, for which the cut material is guided back in the direction towards the blade by baffles in the flow channel, so that the cut material can be reduced in size again. However, such baffles only partially achieve the desired size reduction of the cutting material. This is also associated with increased noise production.

OBJECT OF THE INVENTION

The invention is based on the task of presenting a mower of the class mentioned in the introduction with an improved mulching function. In particular, it has the effect that relatively small cut material is produced.

SUMMARY OF THE INVENTION

The task is accomplished according to a first embodiment of the invention such that the front region of the blade housing in the mowing direction is at least partially covered by a base plate, which extends between the blade and ground, and in the operating position, the rotational plane of the blade is inclined at an angle of more than 0° to 15° to the ground. The slope is selected so that the front region of the blade is higher than the rear at an alignment parallel to the mowing direction. The material to be cut is first grabbed by the rotating blade behind the base plate. Due to the inclined profile of the blade relative to the ground, the cutting material that is upright behind the base plate due to the suction effect is first cut at the top free end. In the farther course of the movement, the cutting material moves into the deeper region of the blade and is cut to the desired length. This means that the cutting material is shortened several times by small sections to the set cutting height in the course of the mowing movement. Therefore, reduced-size cutting material with shorter individual pieces can be produced. Its use as mulch is thus possible without any additional means.

The blade can be inclined relative to the rotational axis. However, preferably the rotational axis is inclined relative to the blade housing, so that a symmetrical configuration of the blade about the rotational axis is still possible. In principle, it is also possible to raise the entire mower in the front region.

However, the inclined profile of the blade has the disadvantage that an absolutely flat surface cannot be cut. Instead, according to the angle of inclination, a slightly wavy profile of the individual strips is produced with the lowest region in the middle.

According to another embodiment of the invention, in the operating position, the rotational plane of the blade is essentially parallel to the ground and the front region of the blade housing in the mowing direction is at least partially covered by a base plate, which extends between the blade and the ground, and the blade has at least two cutting edges or cutting edge regions with different cutting heights in the radial direction. In particular, the outer cutting edges generate a lower cutting height than the inner cutting edges. For this embodiment, the material to be cut is likewise first cut behind the base plate by the rotating blade. The material to be cut stands upright in a known way due to the suction effect, wherein the inner grass blades in terms of the cutting width are cut several times first by the inner cutting edges and then again by the outer cutting edges. Thus, in comparison with conventional mowers, greater size-reduced cutting material is produced. Only the grass blades in the outer region of the cutting width are cut directly to the set cutting height. Overall, however, this produces size-reduced cutting material that is well suited for use as mulch. In particular, however, a flat cut of the grass is produced.

It can be provided, e.g., that at least one cutting edge or one cutting edge region of the blade extends diagonally down and out in the radial direction. In the operating position of the mower, the slope can equal from 15° to 45° to the ground. According to another embodiment, it is possible that the mower has a stepped profile in the radial direction such that inner cutting edges or cutting edge regions in terms of the rotational axis are provided with a higher cutting height and the outer cutting edges or cutting edge regions are provided with a lower cutting height. In addition, a combination of section-wise diagonal profiles and section-wise stepped profiles can be used together. Through all of these means, the inner region of a cutting strip is cut several times to the desired cutting height.

For a rotary mower, a blade of grass is cut only due to the high rotational speed of the cutting edges of the blade. It is obvious that the rotational speed depends on the radius. To achieve a clean cut over the entire region of the cutting edges, it can be advantageous if an inner section of the blade in the radial direction has no cutting edge and is formed as a disk.

Furthermore, it is advantageous in the operating position if at least the outer cutting edges in the radial direction or the cutting edge regions are aligned essentially parallel to the ground. This creates a clean end section.

The base plate can basically be formed with any shape. The base plate can be essentially flat and in the operating position essentially parallel to the ground or to the rotational plane of the blade. However, it can also be advantageous if the base plate is adapted to the radial profile of the blade. This has the advantage that the material to be cut is not pressed down so strongly in the center region, so that the tips can stand up more quickly. The tips are thus securely gripped from the inner region with the higher cutting height, so that the desired reduction in size of the cutting material is realized.

The base plate extends from the front up to approximately the center of the blade housing. This has the effect that the outer, lowest regions of the blade in the cutting direction are initially covered. Therefore, it can also be sufficient if the base plate covers the outer, front region of the blade with a partial ring shape. These means also have the effect that at least one part of the cutting material over the strip width is first cut by the cutting edges of the blade with higher cutting height.

The base plate can overlap the rotational axis. Here, it can be advantageous if the rotational axis is mounted in bearings on the base plate. This creates an especially stable structure of the mower, because the blade is no longer supported in a floating way as usual.

The cut material can be left in the cut and size-reduced state on the ground. The cutting material can also first be collected in order to then be distributed in a fine and uniform pattern on the cut ground or on another surface. For this purpose, the mower can be equipped with a discharge opening, which interacts with a corresponding collection device. For such a mower it is provided that the base plate at least partially overlaps the discharge opening in the direction of rotation or extends outwards over this opening. This has the advantage that no grass can be cut in the region of the discharge opening and directly taken away. Instead, the cutting material cut there is transported at least once more about the rotational axis in the blade housing, which causes another reduction in size.

Alternatively, the blade housing can be formed so that it is open at the back in the direction of travel. Then the size-reduced cutting material is discharged out the back.

How the base plate is mounted on the blade housing is basically arbitrary. It is advantageous if the base plate is connected to the blade housing so that it can be detached. Therefore, it is possible to easily repair the blade or, e.g., exchange the blade.

The mower can be equipped in a typical way with a cutting height adjustment device. The blade can be driven, e.g., by a gasoline engine or by an electric motor. Also, the wheels can be free-running or they can be driven. Also, known roller devices that run behind the mower can also be provided for ground compression or for pressing down the blades of grass.

For hand-pushed mowers, in principle, a blade with two diametrically opposed cutting edges can be sufficient. For a quicker cutting result, e.g., for mowing tractors, two or three blades each with diametrically opposed cutting edges can be provided rotating around the common rotational axis.

In the preceding description, the invention was described with reference to a single blade. For mowers of larger cutting widths, it is sometimes necessary to arrange several blades one next to the other. Here, each blade can be provided with such a base plate, so that the desired size reduction of the cutting material is achieved.

BRIEF DESCRIPTION OF THE DRAWINGS

The invention is described in more detail in the following with reference to the schematic drawing. Shown are.

DETAILED DESCRIPTION OF THE PREFERRED EMBODIMENT

Figure 1:
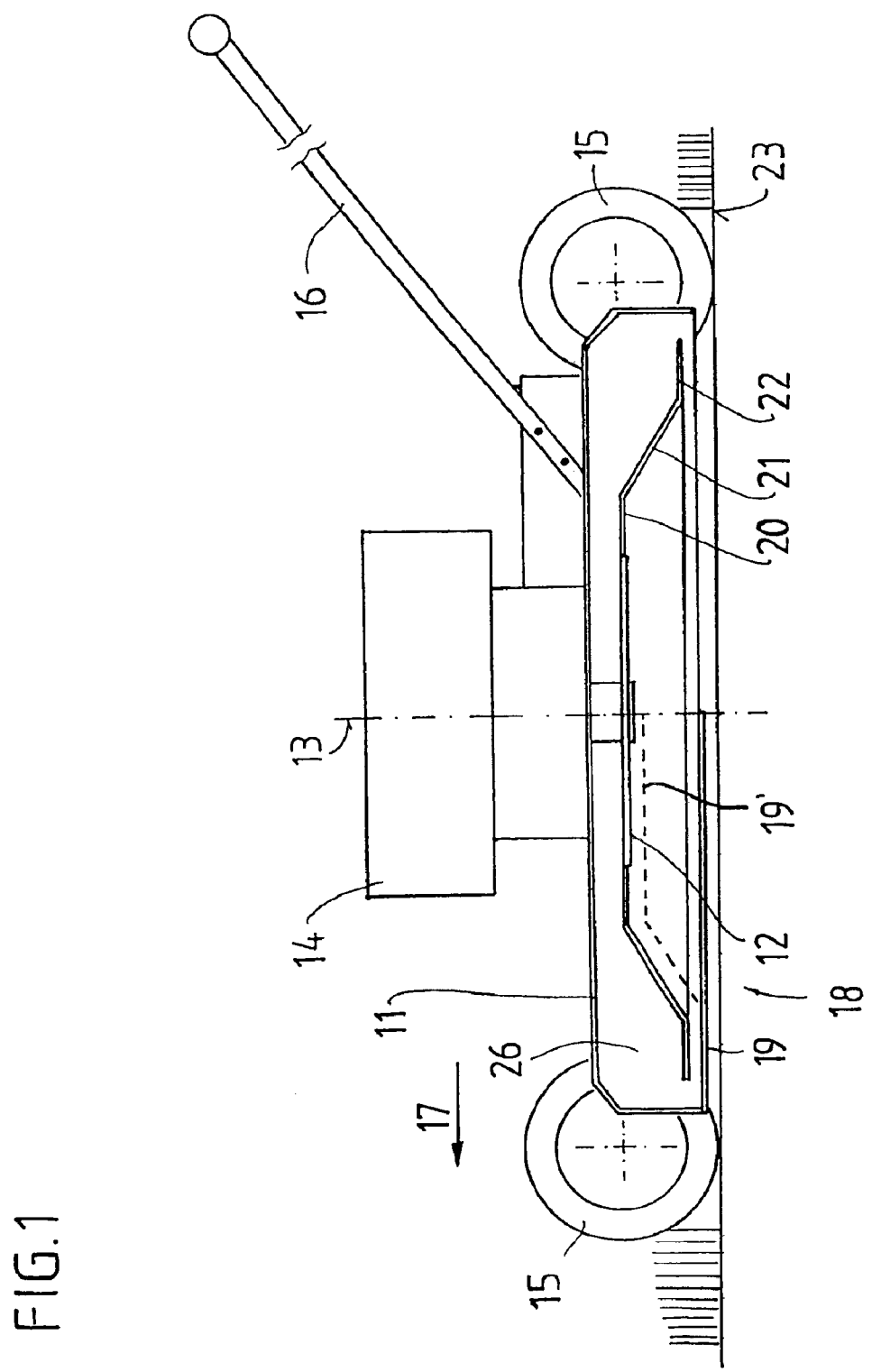
FIG. 1, a side view of a mower according to the invention, partially in section.
Figure 2:
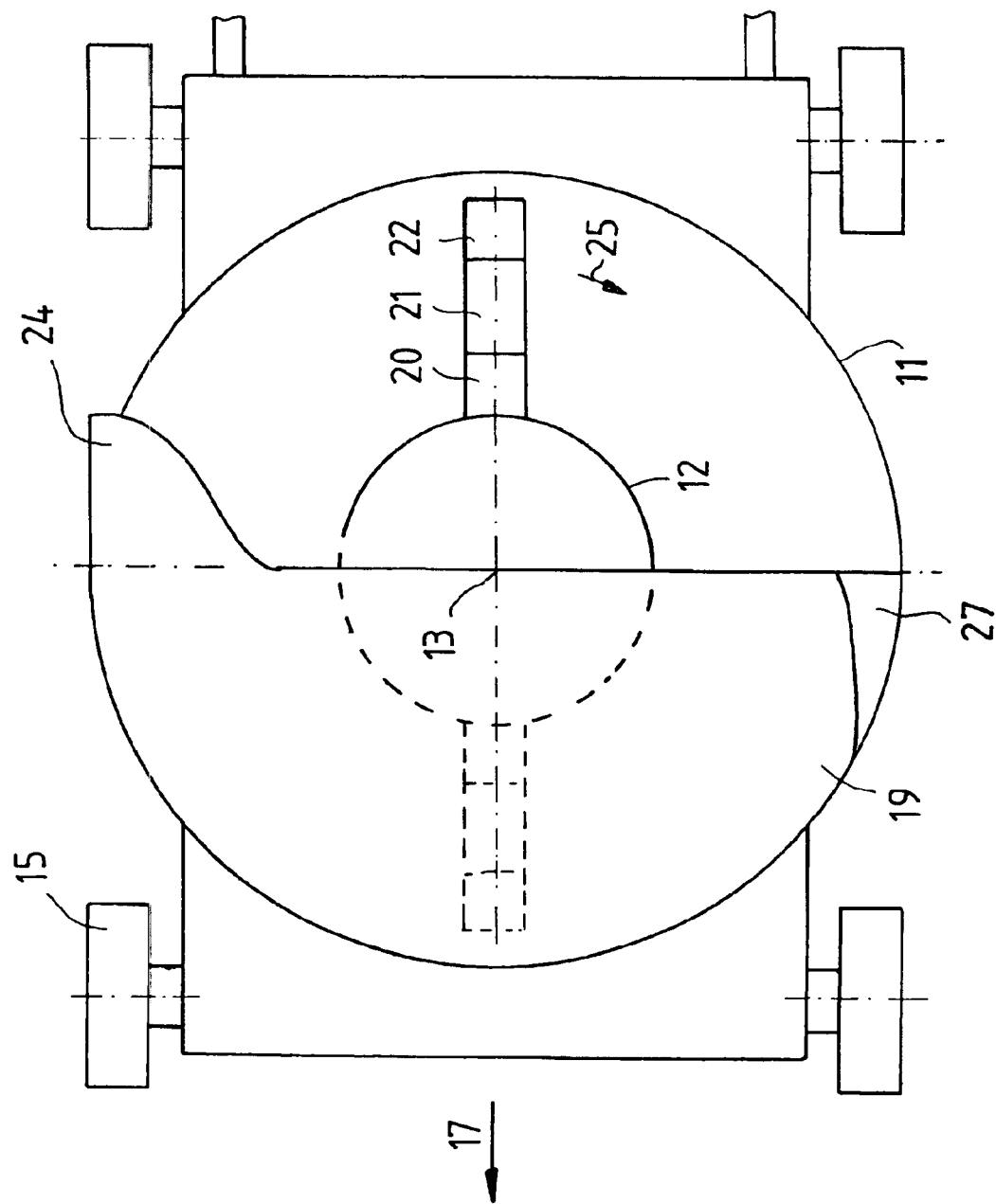
FIG. 2, the bottom view of a mower according to FIG. 1.

The mower shown in the drawing has a blade housing 11, which is open at the bottom and in which a blade 12 is mounted so that it can rotate about a vertical axis 13. On the side of the blade housing facing away from the blade, there is a motor 14 for driving the blade 12. The drive shaft of the blade 12 extends through the blade housing 11 to the motor 14. Sliding and safety clutches, as well as brakes, can be provided in order to prevent damage to the blade when meeting an obstacle.

In the embodiment, the blade 12 is formed essentially straight and extends over the entire diameter of the cutting circle formed by rotation. This achieves a structure that is symmetrical to the rotational axis. For a quicker cutting result, several such straight blades can be arranged symmetrical to the rotational axis, e.g., two blades offset by a 90° angle or three blades offset by a 60° angle.

Figure 3:
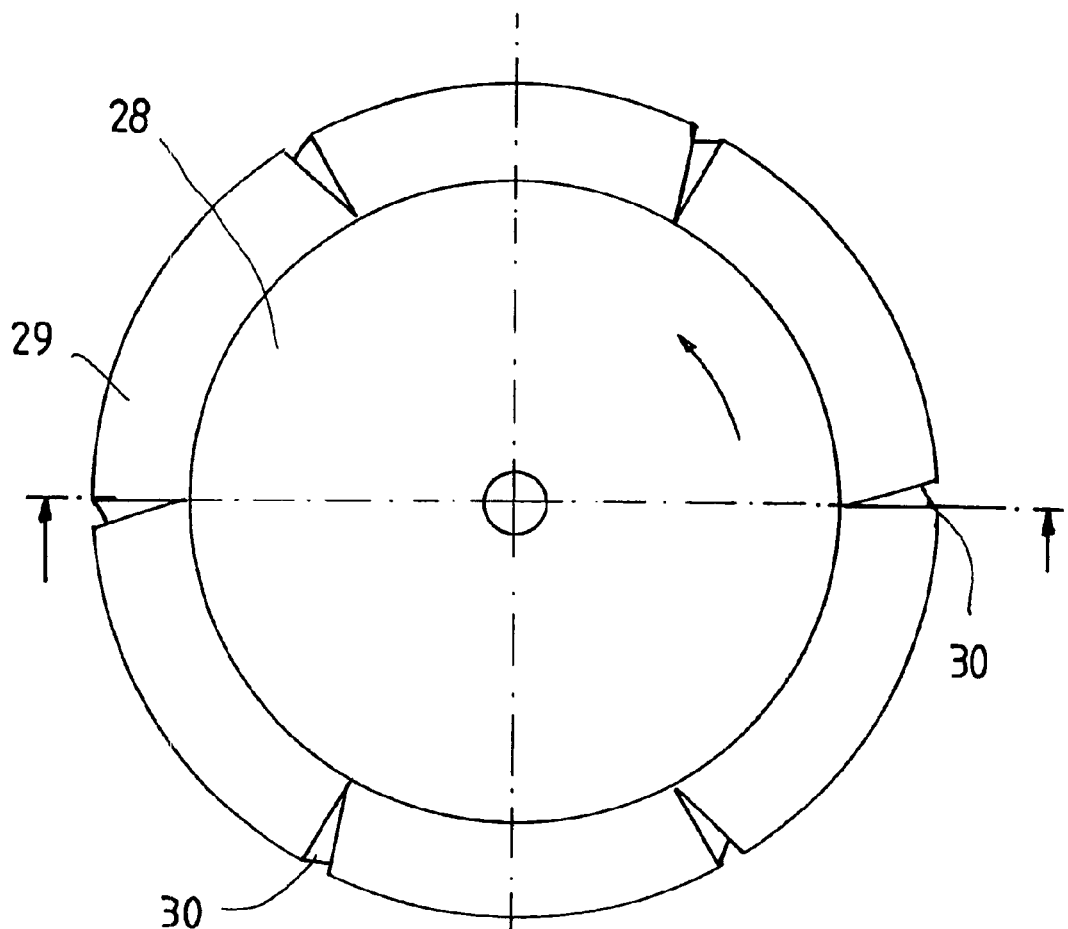
FIG. 3, the bottom view of a blade according to another embodiment of the invention.
Figure 4:
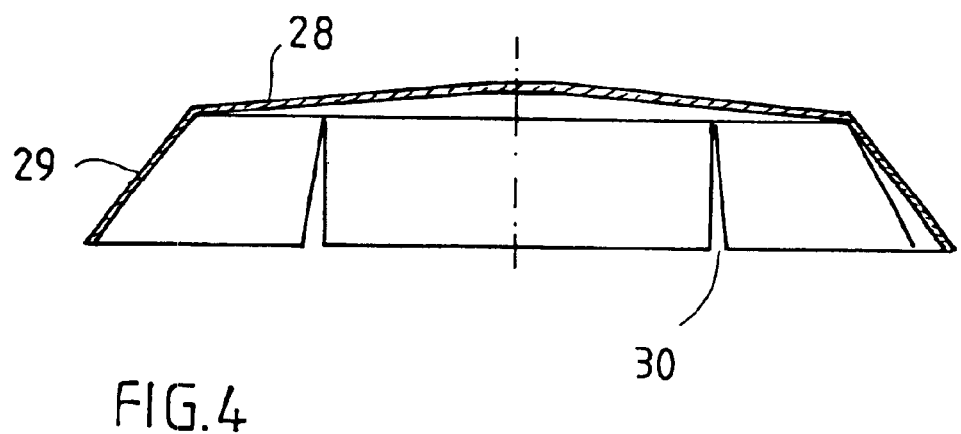
FIG. 4, a section through the blade according to FIG. 3.

However, it can also be provided, as shown in FIGS. 3 and 4, that the blade is formed as a closed bell 28 that is open at the bottom with an outer edge 29 in the radial direction, which is inclined downwards and out. The cutting edges or cutting edge regions are formed as notches 30 that are bent inwards in the edge. However, larger recesses with bent cutting edges or a cutting edge region on the edge can also be present. This achieves a stable structure of the blade. At least two and preferably four to ten or twelve cutting edges or cutting edge regions that are symmetrical to the rotational axis can be provided on the edge. This can achieve a quicker cutting result for greater feeding speeds. The edge can run in the operating position at an angle between 45° and almost 90° inclined to the ground. The edge can thus be formed in a straight line or also curved. The cutting edges can be formed by notches, which begin at the lower edge of the bell edge, or else by notches arranged in the center in the edge. Overall, a good reduction in size is achieved, because the cutting material is guided outwards through the slots to the cutting edge by the rotational movement and the resulting suction.

In principle, the blade shown in FIGS. 3 and 4 can also be used for a mower without a base plate, thus for a conventional rotary mower. Then the preferred special mulching function is not provided. Nevertheless, a stable blade with a faster cutting result is achieved.

Furthermore, the blade housing 11 is provided at the front and back with running wheels 15, which can be adjusted, e.g., in height. Therefore, the blade is located at a certain distance to the ground, which defines the cutting height. A higher blade with a higher cutting edge creates a higher cut edge, while a lower cutting edge produces a shorter cut. Furthermore, the blade housing 11 is provided with a handle 16, with which the mower can be pushed and operated. In this respect, the described mower corresponds to a conventional rotary mower and needs no further explanation.

For use as a mulching mower, the mower housing 11 in the front region 18 in the mowing direction 17 is provided with a base plate 19, which extends underneath the blade housing 11 between the blade 12 and the ground 23. This base plate 19 approximately overlaps the front half of the essentially circular blade housing 11.

Furthermore, in the radial direction the blade has cutting edges or cutting edge regions 20, 21, 22, which are each arranged at different cutting heights. For the embodiment shown in the drawing, the inner cutting edges 20 and the outer cutting edges 22 are aligned horizontally, while the intermediate cutting edge 21 has a region inclined downwards and out. In particular, the outer cutting edge 22 is lower than the inner cutting edge 20 and thus creates a lower cutting height.

Through this arrangement of cutting edges 20, 21, 22 with different heights in connection with the base plate covering the front cutting region, the grass is first gripped behind the base plate by the blade. This prevents the grass from being gripped first by the outer and lowest blade section in the radial direction. Instead, the center region of the worked strip is cut first by the blade section 20, which has a higher cutting height. In the further course of movement, this region and the farther outside region in the radial direction is cut by the diagonal cutting edge region 21. Only then is subsequent cutting to the desired cutting height performed by the outer section 22 of the blade 12 in the radial direction. Only the outer edge region of the strip to be mowed is cut directly to the desired cutting height.

The difference of the cutting edges or cutting edge regions 20, 21, 22 with different heights can be 1 cm to 15 cm, and especially 1 cm to 10 cm. A distance between 1 cm to 5 cm is preferred. Overall, this produces a good size reduction of the cutting material, which can be used as mulch.

The schematically illustrated lawnmower also has a discharge opening 24 for the cutting material. This is advantageous, e.g., when the cut and size-reduced cutting material is not to be left directly on the cut surface. Here, as seen in the projection, the base plate 19 overlaps the discharge opening. This has the advantage that in the region of the discharge opening, no material to be cut is cut. Instead, the material is first cut behind the discharge opening in the direction of rotation 25 of the blade, so that it is forced to run through the blade housing at least once, which produces further size reduction.

It is also favorable if the base plate 19 has at least one outer recess 27 in the radial direction in the region of the inlet to the blade in the region covered by the base plate and if the blade housing is open at the bottom there. This has the effect that the grass blades can be brought upright better and quicker and can be gripped more securely. For the shown embodiment of the mower, the base plate is formed flat and parallel to the ground underneath the blade housing. It is also possible for the base plate 19' to be adapted at least partially to the profile of the blade and to run at the same distance to the cutting edges or regions, e.g., at least in sections. This configuration of the base plate is shown in FIG. 1 with a dashed line.

The preceding description concerns a mower that operates over essentially horizontal ground. During operation on an inclined or uneven ground, the selected reference terms horizontal and vertical are to be understood and adapted correspondingly.

With such a configuration of a mower, a very good size reduction of the cutting material can be achieved. In particular, the material to be cut is cut several times, whereby the desired size reduction is set directly. Also, due to the covering of the discharge device, the material is transported at least once through the space 26 formed by the base plate 19 and the blade housing 11, whereby the material comes into contact with the blade several times. This produces another size reduction of the cutting material. Additional baffles can also be provided, which guide the cutting material back in the direction towards the blade 12. An optimum size reduction of the cutting material for use as mulch is thus achieved.

What is claimed is:

1. A mower comprising a blade housing (11), in which a blade (12) rotates about a vertical rotational axis (13) in a rotational plane, which, in an operating position, is essentially parallel to a ground surface, so that for movement of the mower in a mowing direction (17), cutting material is cut from the ground surface corresponding to a diameter of the blade, a front region (18) of the blade housing in the mowing direction (17) is partially covered by a base plate (19), which runs between the blade and the ground surface, and the blade has in a radial direction at least two cutting edge regions (20, 21, 22) with different cutting heights that each extend beyond the base plate (19) for cutting the cutting material from the ground surface.

2. A mower according to claim 1, wherein an inner section of the blade in the radial direction has no cutting edge and is formed as a disk.

3. A mower according to claim 1, wherein at least an outermost cutting edge (22) in a radial direction is aligned essentially parallel to the ground in the operating position.

4. A mower according to claim 1, wherein the base plate (19) is substantially flat and parallel to the rotational plane of the blade.

5. A mower according to claim 1, wherein the base plate (19) extends from a front to approximately a middle of the blade housing.

6. A mower according to claim 1, wherein the base plate has at least one outer recess (27) in a region providing an inlet to the blade.

7. A mower according to claim 1, wherein the blade housing has a lateral discharge opening (24) for the cutting material and the base plate (19) at least partially extends under the discharge opening.

8. A mower according to claim 1, wherein the blade housing has an open back relative to a direction of travel.

9. A mower according to claim 1, wherein a cutting height of the cutting edge regions (20, 21, 22) decreases in steps at least in sections from inside to outside in the radial direction.

10. A mower according to claim 9, wherein at least one cutting edge region (21) of the blade (12) extends diagonally downwards and outward in the radial direction.

11. A mower according to claim 10, wherein, in the operating position, the at least one cutting edge region extends at an angle between 15° and 45° inclined to the ground surface.

12. A mower according to claim 1, wherein at least one cutting edge region (21) of the blade (12) extends diagonally downwards and outward in the radial direction.

13. A mower according to claim 1, wherein the blade has a stepped profile at least in sections in the radial direction, such that an inner cutting edge region (20) with reference to the rotational axis is provided with a higher cutting height, and an outer cutting edge region (22) is provided with a lower cutting height.

14. A mower according to claim 1, wherein the base plate (19') is shaped similar to a radial profile of the blade.

15. A mower, comprising:
 a wheeled blade housing having wheels driven by an engine or motor; and
 a blade which rotates about a vertical rotational axis within said housing so that, for movement of the mower in a mowing direction, cutting material is cut from the ground surface corresponding to a diameter of said blade;

said blade housing having a front region in a mowing direction partially covered by a base plate that runs directly between said blade and the ground surface; and said blade having in a radial direction at least two cutting edge regions (20, 21, 22) at different cutting heights that each extend beyond said base plate for cutting the cutting material from the ground surface.

* * * * *